UNITED STATES PATENT OFFICE.

CHARLES ISIDORE FLASSCHOEN, OF PARIS, FRANCE.

MANUFACTURE OF MEDICATED FOOD.

SPECIFICATION forming part of Letters Patent No. 287,429, dated October 30, 1883.

Application filed March 27, 1883. (No specimens.) Patented in France June 7, 1881, No. 143,249, and in England February 28, 1883, No. 1,085.

*To all whom it may concern:*

Be it known that I, CHARLES ISIDORE FLASSCHOEN, a citizen of France, residing at Paris, in the French Republic, have invented new and useful Improvements in the Manufacture of Medicated Food, (for which I have obtained a patent in Great Britain, No. 1,085, bearing date February 28, 1883, and also in France June 7, 1881, No. 143,249,) of which the following is a specification.

The object of this invention is to introduce into matters of daily consumption—such as bread, chocolate, biscuits, and so forth—certain medicinal properties that will assist digestion and nutrition. It being specially adapted to persons of delicate health, and for children while growing, the matters thus introduced not affecting the taste in the least degree, the food is readily taken without the slightest objection.

To every five hundred grams of bread, biscuit, or chocolate, the several ingredients are added in the following proportions, viz: To every five hundred grams of bread are added, in its manufacture, two centigrams of a salt of iron, seven milligrams of a salt of manganese, and fifty centigrams of phosphate of lime. In the manufacture of chocolate tablets, to every five hundred grams are added twenty centigrams of salt of iron, seven centigrams of salt of manganese, and five grams of phosphate of lime. To every dozen of table-biscuits are added twelve centigrams of salt of iron, four centigrams of salt of manganese, and from three to six grams of phosphate of lime. The iron and manganese are employed in the form of carbonates.

I claim as my invention—

The improved mixture herein described, for union with bread, biscuit, chocolate, or other articles of food, consisting of salts of iron, salts of manganese, and phosphate of lime, in the manner and about in the proportions specified, for the purposes set forth.

CHARLES ISIDORE FLASSCHOEN.

Witnesses:
ROBT. M. HOOPER,
G. HÉBRÉ.